US008930453B2

(12) United States Patent
Panyam et al.

(10) Patent No.: US 8,930,453 B2
(45) Date of Patent: Jan. 6, 2015

(54) SOCIAL NETWORKING RELEVANCE INDEX

(75) Inventors: Sai Panyam, Sunnyvale, CA (US); Fredrick Roby, Chino, CA (US); Sam Mansukhani, Playa Del Rey, CA (US)

(73) Assignee: Myspace LLC, Beverly Hills, CA (US)

( * ) Notice: Subject to any disclaimer, the term of this patent is extended or adjusted under 35 U.S.C. 154(b) by 95 days.

(21) Appl. No.: 13/282,854

(22) Filed: Oct. 27, 2011

(65) Prior Publication Data

US 2012/0110080 A1 May 3, 2012

Related U.S. Application Data

(60) Provisional application No. 61/407,018, filed on Oct. 27, 2010.

(51) Int. Cl.
*G06F 15/16* (2006.01)
*G06Q 50/00* (2012.01)

(52) U.S. Cl.
CPC .................................... *G06Q 50/01* (2013.01)
USPC .......................................... 709/204; 715/768

(58) Field of Classification Search
CPC ................................ G06F 15/16; G06F 17/30
USPC .......................................... 709/204; 715/768
See application file for complete search history.

(56) References Cited

U.S. PATENT DOCUMENTS

| | | | | |
|---|---|---|---|---|
| 2007/0067737 | A1 * | 3/2007 | Zielinski et al. | 715/810 |
| 2009/0006371 | A1 | 1/2009 | Denoue et al. | |
| 2009/0307003 | A1 * | 12/2009 | Benyamin et al. | 705/1 |
| 2010/0082693 | A1 | 4/2010 | Hugg et al. | |
| 2010/0257183 | A1 | 10/2010 | Kim et al. | |
| 2011/0270824 | A1 * | 11/2011 | Morris et al. | 707/722 |

FOREIGN PATENT DOCUMENTS

| | | |
|---|---|---|
| KR | 10-2010-0077895 | 7/2010 |
| WO | WO 2010030978 A2 * | 3/2010 |

OTHER PUBLICATIONS

International Search Report mailed May 23, 2012, International Application No. PCT/US2011/058052, International filing date Oct. 27, 2011.

* cited by examiner

*Primary Examiner* — David Lazaro
*Assistant Examiner* — Marie Georges Henry
(74) *Attorney, Agent, or Firm* — Gates & Cooper LLP

(57) ABSTRACT

A system and method are provided for organizing a listing of activities on a social networking website, including present each user of the plurality of users an organized representation of activities, the representation of activities sorted by how relevant each activity is to the particular user.

13 Claims, 15 Drawing Sheets

SOCIAL NETWORKING RELEVANCE INDEX

CROSS REFERENCE TO RELATED APPLICATIONS

The present application claims priority to U.S. Provisional Patent Application Ser. No. 61/407,018, filed Oct. 27, 2010, the entire contents of which are specifically incorporated by reference herein.

TECHNICAL FIELD

This invention relates generally to social networking. More particularly, this invention relates to methods and systems of presenting information to a user through a social networking website.

BACKGROUND OF THE INVENTION

Generally, a visual feed, stream, or other listing of activities on a social networking site are organized in chronological order. For example, a user of the social networking site may be associated with a plurality of contacts, or "friends." Any of these friends may engage in an activity, and this activity may be organized in a stream or feed on a user interface of the social networking site to be displayed to the user. It follows that as the number of friends the user has increases, and/or the number of activities each friend engages in increases, it is substantially difficult for the user to discern between activities within the stream in a meaningful manner.

Further, current systems tend to lose out on activities that may be important to a user, but have rolled out of view in an activities list simply because of the date of an activity. Also, a stream can be filled by the activities of a more prolific user, thus pushing out activities from other users that are older.

What is needed in the art is a better way of presenting user-relevant information or activities to a user.

SUMMARY

The above described and other problems and disadvantages of the prior art are overcome or alleviated by the present system and method for organizing a listing of activities on a social networking website, including present each user of the plurality of users an organized representation of activities, the representation of activities sorted by how relevant each activity is to the particular user.

Exemplary embodiments further provide such a system and method by retrieving a listing of activities from a social network; determining relevance factors for each activity in the listing of activities; calculating a relevance index for each activity based on its associated relevance factors; organizing the listing of activities based on each activity's relevance index; and displaying the organized listing of activities.

Further exemplary embodiments provide a mechanism from selectively materializing activities that are most relevant to a viewing user on a social network by identifying particular relevance factors having predefined weights and combining them according to such weights to get a relevancy index. Further exemplary embodiments utilize one or more such factors, including an engagement portfolio value, as a weighted sum of all engagements done by a user on the social network; a user affinity, as a score of a particular user's affinities to certain activity types; a user friend affinity, as a score of a particular user's affinity to a friend's activity types; a recency, as an exponential decay function that decays activity persistence in a stream based on a predefined decay constant (with higher value activities persisting in a stream longer than lower value activities); a friendship, as a score based on how close knit a user is with a friend; and a communication, as a score based how often a user has interacted with a friend.

In other exemplary embodiments, one or more or all of the above factors are normalized and combined to generate a relevancy index for each activity, wherein a top portion of relevant activities are shown to a user. Further exemplary embodiments provide a stream diversity and relevance measurement process, which process uses user testing to convert a subjective opinion of relevance to an objective score to compare two streams for determining which one is more relevant to a user.

Accordingly, relevant embodiments of the present invention advantageously provide one or more of the following benefits: displaying the most relevant activities to a user; increasing a user's time on a social networking site due to the fact that a user is more engaged with the site; increasing click through rates because of the fact that a user is presented with activities more relevant to a user; and encouragement for user to log into the site more often to view updates.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several FIGS..

DETAILED DESCRIPTION

Figure 1:
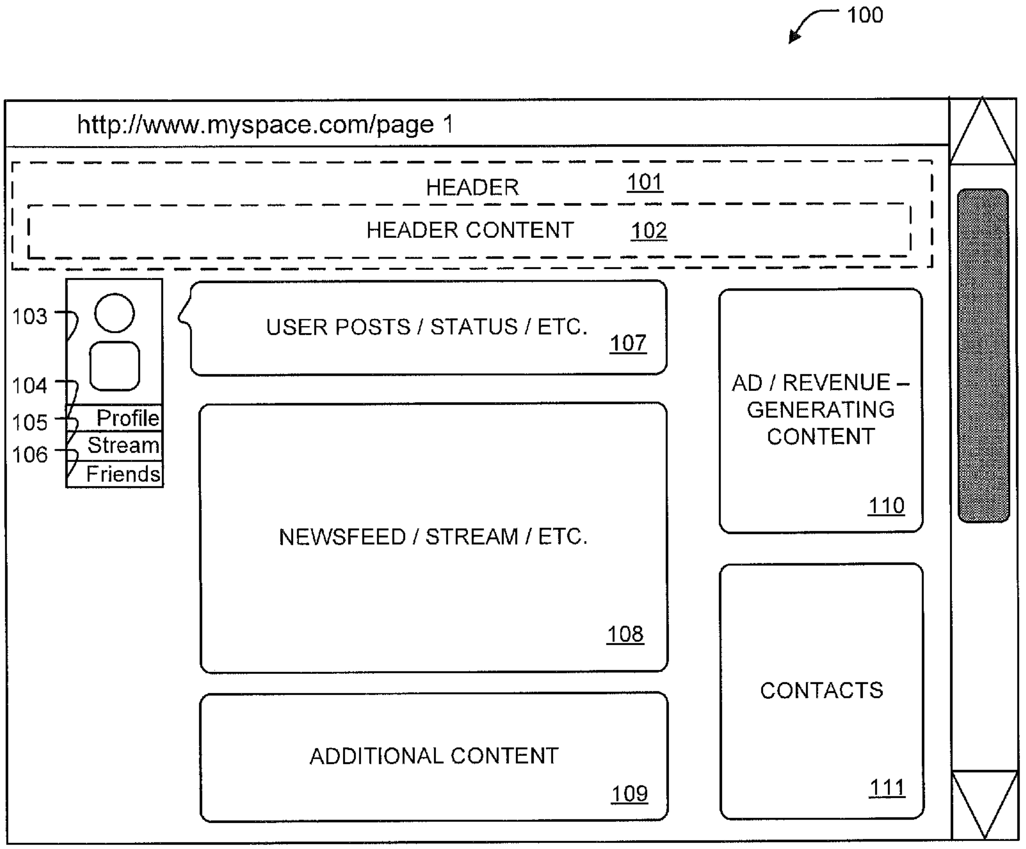
FIG. 1 illustrates a social networking website user interface 100, which may be presented to a user through a computer apparatus connected to a server facilitating the social networking website, according to an example embodiment.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be further understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will also be understood that the terms "photo," "photograph," "image," or any variation thereof may be interchangeable. Thus, any form of graphical image may be applicable to example embodiments.

It will also be understood that the terms "audio," "audio tracks," "music," "music tracks," or any variation thereof may be interchangeable. Thus any form of audio may be applicable to example embodiments.

It will also be understood that the terms "media," "multimedia," "video," or any variation thereof may be interchangeable. Thus any form of rich media may be applicable to example embodiments.

It will also be understood that the terms "statistics," "measurements," "analytics," "calculations," or other similar terms may be used to describe example forms of the associated definitions as understood by one of ordinary skill in the art, although other similar acts/functions may be applicable depending upon any particular form of an example embodiment. For example, a statistical calculation may include analytical calculations, and vice versa. Furthermore, measurements may include calculations upon, during, subsequent, or in addition to measurements or any act of retrieving data.

It will also be understood that the terms activity stream, news feed, and/or other similar terms may be used interchangeably, unless the context clearly indicates otherwise.

It should also be understood that other terms used herein may be applicable based upon any associated definition as understood by one of ordinary skill in the art, although other meanings may be applicable depending upon the particular context in which terms are used.

Therefore, the terminology used herein is for the purpose of describing particular embodiments only and is not intended to be limiting of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Further to the brief description provided above and associated textual detail of each of the figures, the following description provides additional details of example embodiments of the present invention.

As described herein, example embodiments of the present invention may include methods and systems of calculating meaningful statistics of a social networking or other form of website through analysis of user interaction, and utilizing these meaningful statistics to develop a robust relevance index applicable to a plurality of user activities. The relevance index of particular activities may then be used to organize a group of activities in a relevant manner such that a user may easily interact with the organized group of activities.

For example, an organized group of activities may be presented to a user on a user interface of a social networking website. The activities may be presented as a listing, grouping, stream, news feed, or in any other manner. The activities may be organized based on individual activities' relevance indexes. For example, more relevant activities may be presented for viewing before other less relevant activities, or may be placed in better view on the user interface presenting the grouping. Less relevant activities may be presented later, or for example below a default viewing area of the user interface, thereby allowing a user to better view more relevant activities. In the case of a scrolling or scrollable interface, the less relevant activities may simply be placed lower on a listing which is traversable by a user. In the case of a fixed viewing area, only a picked set of activities, or a picked set incorporating stream diversity, may be presented to a user. However, it should be understood that the example implementations of presenting an organized grouping of activities should not be limiting, as the relevance indexes, recency factors, and stream diversity methodologies provided herein are applicable in a plurality of user interfaces.

Exemplary embodiments provide such a system and method by retrieving a listing of activities from a social network; determining relevance factors for each activity in the listing of activities; calculating a relevance index for each activity based on its associated relevance factors; organizing the listing of activities based on each activity's relevance index; and displaying the organized listing of activities.

Further exemplary embodiments provide a mechanism from selectively materializing activities that are most relevant to a viewing user on a social network by identifying particular relevance factors having predefined weights and combining them according to such weights to get a relevancy index. Further exemplary embodiments utilize one or more such factors, including an engagement portfolio value, as a weighted sum of all engagements done by a user on the social network; a user affinity, as a score of a particular user's affinities to certain activity types; a user friend affinity, as a score of a particular user's affinity to a friend's activity types; a recency, as an exponential decay function that decays activity persistence in a stream based on a predefined decay constant (with higher value activities persisting in a stream longer than lower value activities); a friendship, as a score based on how close knit a user is with a friend; and a communication, as a score based how often a user has interacted with a friend.

In other exemplary embodiments, one or more or all of the above factors are normalized and combined to generate a relevancy index for each activity, wherein a top portion of relevant activities are shown to a user. Further exemplary embodiments provide a stream diversity and relevance measurement process, which process uses user testing across a statistically significant sample to convert a subjective opinion of relevance to an objective score to compare two streams for determining which one is more relevant to a user (e.g., by measuring precision, i.e. the number of relevant activities retrieved divided by the total number of activities retrieved, and recall, i.e., the number of relevant activities retrieved divided by the total number of existing relevant activities that should have been retrieved, followed by an F-Measure determination, which is the weighted harmonic mean of precision and recall).

Accordingly, relevant embodiments of the present invention advantageously provide one or more of the following benefits: displaying the most relevant activities to a user; increasing a user's time on a social networking site due to the fact that a user is more engaged with the site; increasing click through rates because of the fact that a user is presented with activities more relevant to a user; and encouragement for user to log into the site more often to view updates.

Turning now to the Figures, example embodiments are described herein-below in more detail.

FIG. 1 illustrates a social networking website user interface 100, which may be presented to a user through a computer apparatus connected to a server facilitating the social networking website, according to an example embodiment.

According to FIG. 1, the interface 100 may be any suitable web interface, including an interface comprising a header 101, header content 102, a user identifier (e.g., picture, avatar, etc) 103, user posts/Status 107, stream 108, content 109, advertising content 110, and/or contact listing 111. The interface 100 may further include controls 104, 105, and/or 106 to enhance user-interaction by facilitating easy access to popular features of the interface 100. Although not illustrated directly, it can be appreciated that more content may be available on the interface 100 by "scrolling" down the interface using user interface controls (e.g., slider bar).

The header 101 and header content 102 may be any suitable header including suitable content, including but not limited to banners, banner advertisements, website identification, or other suitable header information.

The user post portion 107 may be any suitable interface rendering displaying a current or relatively recent status of a user accessing the interface 100.

The stream 108 may be a listing or graphical display as described above, and a grouping of relevant activities may be presented to a user thereon.

The additional content 109 may be any additional content, including but not limited to personal posts, blogs, videos, media, hyperlinks or links to media content, or other suitable content.

The contacts portion/listing 111 may be a graphical listing, table, or other presentation of contacts of a user accessing the interface 100. For example, the contacts may be "friends" of the user on the social network providing the interface 100.

Figure 2:
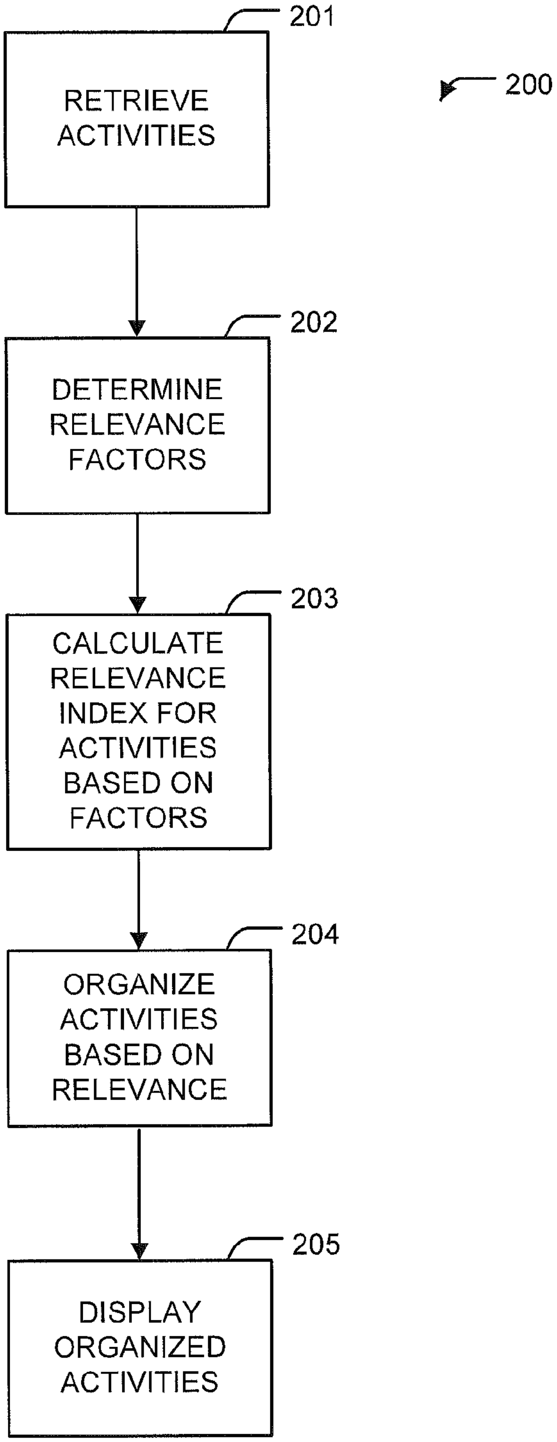
FIG. 2 illustrates a method of organizing activities on a social networking activity stream based on individual activity relevance, according to an example embodiment.

FIG. 2 illustrates a method of organizing activities on a social networking activity stream based on individual activity relevance, according to an example embodiment. For example, the organized activities may be presented on a stream or website interface rendering somewhat similar to portion 108 described above.

The method 200 includes retrieving a set of activities at block 201. The activities may include activities of a particular user accessing a web interface and the activities of his/her contacts/friends. Alternatively, the retrieved activities may include only or substantially more activities of the user's contacts/friends.

The method 200 further includes determining (all) relevance factors at block 202 for each retrieved activity. Calculations and methods of determining each factor are illustrated in detail in FIGS. 3-8. The relevance factors may include an engagement portfolio value, a user affinity, a user-to-friend affinity, recency, friendship, and communication. Each of these factors may be converted or determined as a score or normalized score for use in determining the relevancy index.

The method 200 further includes calculating a relevance index for each retrieved activity based on the determined factors at block 203. The relevance index may be calculated as the sum of weighted and normalized scores (e.g., relevancy factors). The index may be calculated for each retrieved activity, or for a predetermined or desired number of activities. For example, if there is a pool of a large number of activities, with many being older than a predetermined or desired time period (e.g., hours, days, weeks, months), or with many being previously determined as irrelevant, a smaller number activities may be retrieved from the pool for relevancy calculation.

An exemplary formula for calculating a relevance index follows:

$$\text{Relevance Index} = \sum_{i=1}^{n} F_i * W_i,$$

wherein F is the normalized (z-score) factor value with weight W, and n is the number of factors considered for relevance.

In an exemplary embodiment, all six described relevance factors are normalized using z-score and weighted (equally or not) to come up with a relevance index for each retrieved activity. Then the set of all retrieved activities may be sorted by the relevance index, with a top predetermined number of activities being displayed to a user.

The method 200 further includes organizing the activities based on the relevance indexes at block 204. For example, the activities may be organized from most relevant to least relevant. Thereafter, the organized may be presented to a user (205) through a user interface, web browser, mobile browser, RSS feed, dedicated application, short messaging system (SMS) text message(s), or in any suitable manner.

Figure 3:
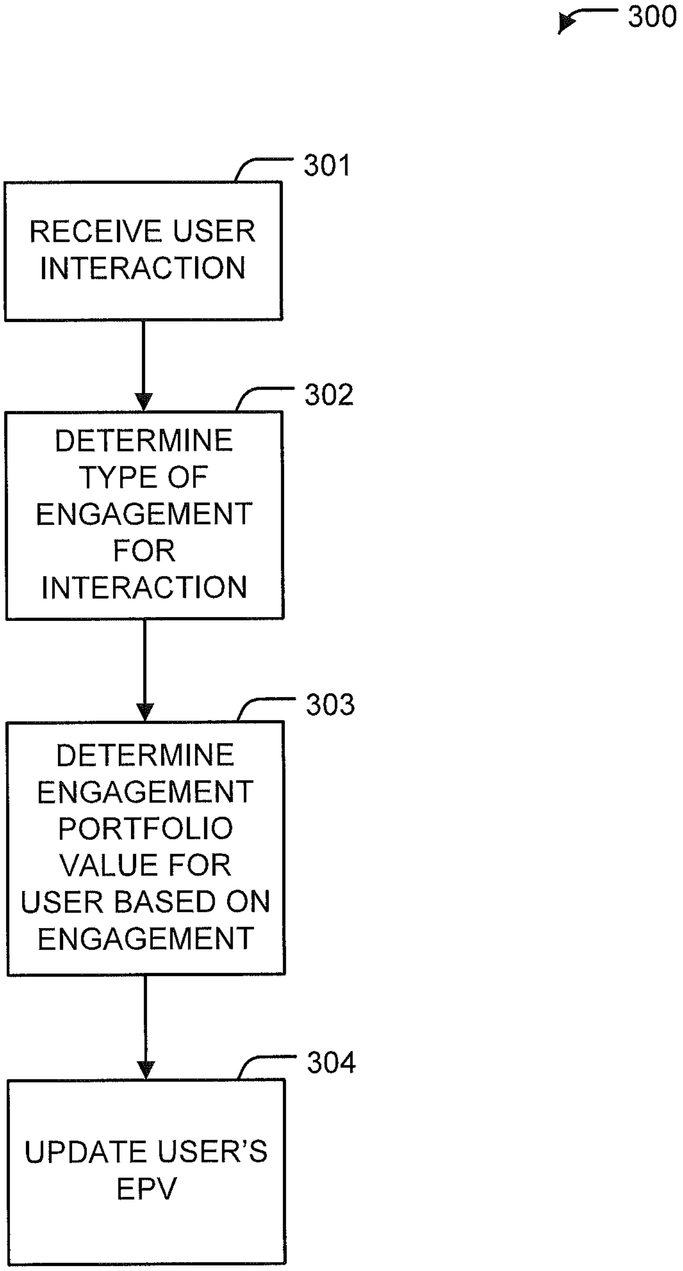
FIG. 3 illustrates a method of determining an engagement portfolio value (EPV), which may be further used to determine the relevance of an activity, according to an example embodiment.

Turning now to FIG. 3, a method of calculating the engagement portfolio value is illustrated. As illustrated, the method 300 includes receiving user interaction at block 301. The user interaction may include any suitable form of engagements and/or activities. Examples of user activities may include clicking through an advertisement, adding a new friend of a social network, expanding a social network, posting real user activities (e.g., status updates, events, etc), uploading and/or sharing multimedia, sharing photos, sharing video, sharing music, or any other suitable activity. Furthermore, user activities may include clicking, accessing, or sharing content already uploaded to the website. For example, a user may access video, music, or any other suitable material posted by a friend or member of a social network, and thus these activities may be tracked. Additionally, a user may click a shared web-link, URL, or other dynamic content previously posted, and thus these activities may also be tracked. Moreover, any other useful or meaningful user activity including new user registration, increasing/decreasing number of friends, web sales, photo deletion, content removal, et cetera may also be tracked. It is also noted that the activities described above are only examples of possible activities to be tracked, and should not be construed as limiting.

The method 300 may further include determining a type of engagement for the interaction at block 302. For example, a type of engagement may be determined through processing of available engagement types/weights/values associated for a particular form of interaction. Accordingly, if a user interacts with a website in a particular manner, that interaction may be associated with an engagement weight used in determining the weighted value for the relevance index sum calculation described above.

The method 300 further includes determining an engagement portfolio value (EPV) for the user at block 303 based upon the type of engagement. The engagement portfolio value may be a value representing a sum of all of the user's engagements taking into consideration associated weights. For example, Equation 1 below depicts an example calculation which may be used to determine an engagement portfolio value:

$$\text{EPV}=\Sigma_{i=1}^{n} E_i * W_i \qquad \text{Equation 1:}$$

The method 300 further includes updating a user's EPV at block 304. For example, a previous EPV may be stored and updated dynamically based on user-interaction with the social networking website.

Figure 4:
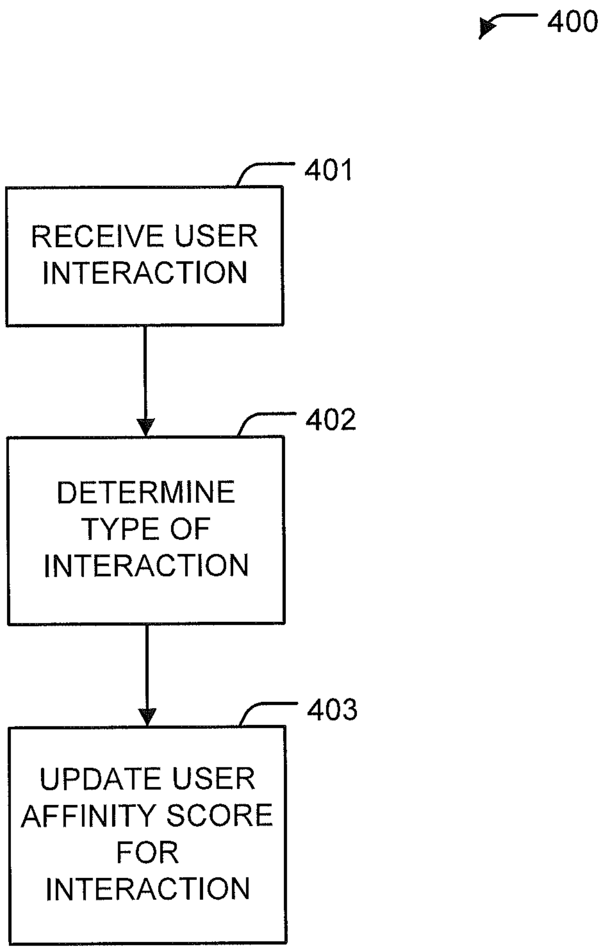
FIG. 4 illustrates a method of determining a user affinity score, which may be further used to determine the relevance of an activity, according to an example embodiment.

FIG. 4 illustrates a method of determining a user affinity score, which may be further used to determine the relevance of an activity, according to an example embodiment.

The method 400 includes receiving user interaction at block 401. The method 400 further includes determining a type of interaction at block 402. The method further includes updating a user affinity score for the type of interaction at block 403. Thus, the user affinity score is a score of a particular user's affinity to certain activity types (e.g., to videos, photos, etc.)

Figure 5:
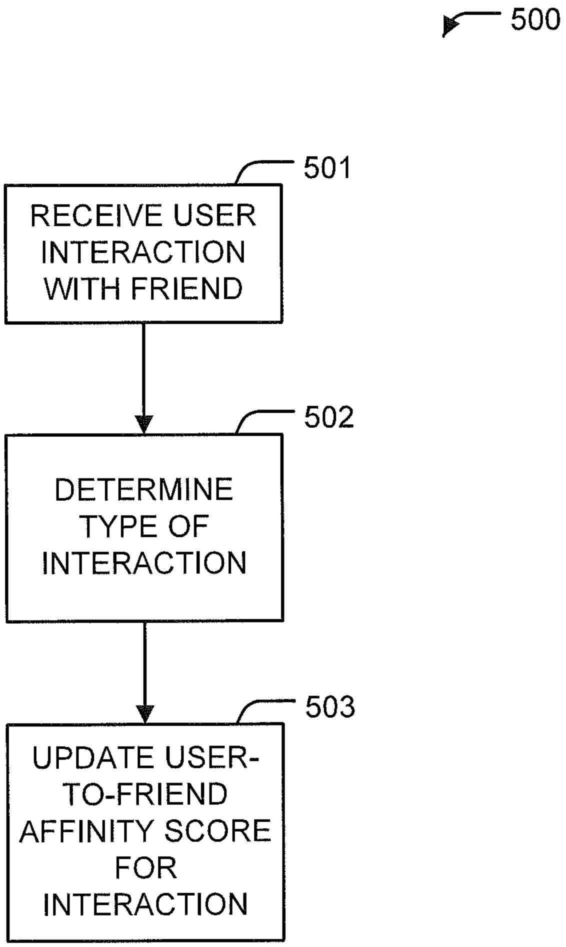
FIG. 5 illustrates a method of determining a user-to-friend affinity score, which may be further used to determine the relevance of an activity, according to an example embodiment.

FIG. 5 illustrates a method of determining a user-to-friend affinity score, which may be further used to determine the relevance of an activity, according to an example embodiment.

The method 500 includes receiving user interaction with a friend of a user at block 501. The method 500 further includes determining a type of interaction at block 502. The method 500 further includes updating a user-to-friend affinity score for the particular interaction at block 503. Therefore, the user-to-friend affinity score is a score of a user's affinity to his/her friends' activity types (e.g., user A may be interested in friend B's videos, but more interested in friend C's photos).

Figure 6:
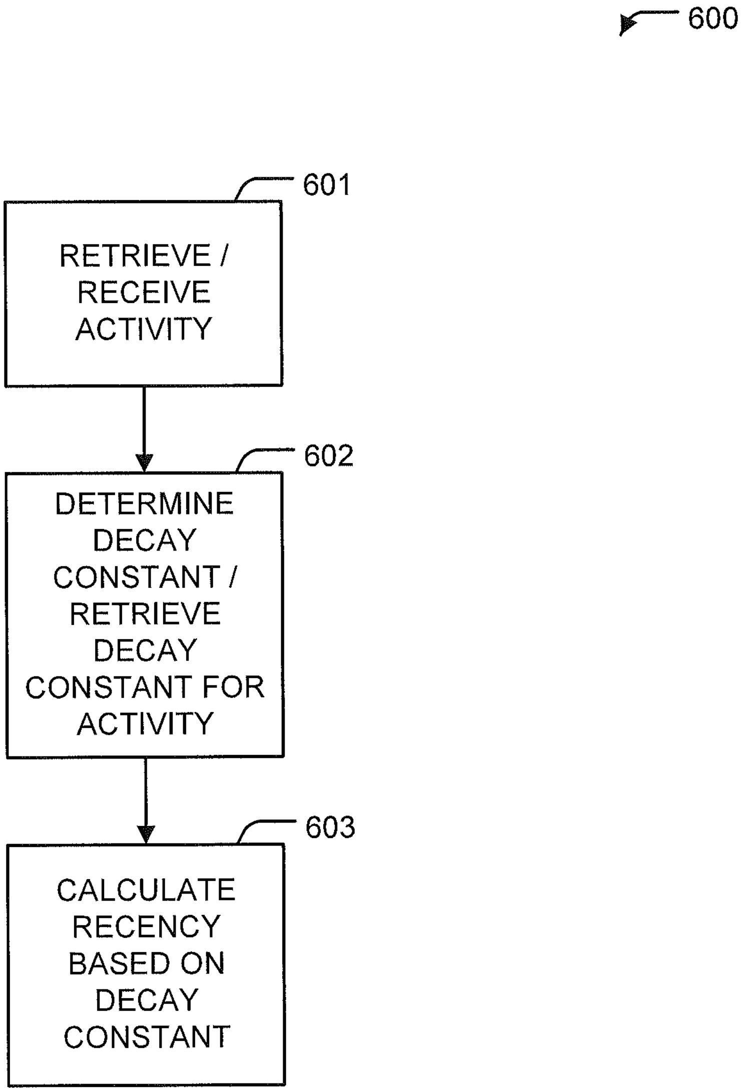
FIG. 6 illustrates a method of determining a recency score, or at least a decay constant used to calculate a recency score, which may be further used to determine the relevance of an activity, according to an example embodiment.

FIG. 6 illustrates a method of determining a recency score, or at least a decay constant used to calculate a recency score, which may be further used to determine the relevance of an activity, according to an example embodiment. In exemplary embodiments, recency takes into account both the date (or time) of an activity as well as how persistent a social network site desires a particular activity to be in a user's stream.

An exemplary recency formula follows:

$$N_t=N_0*e^{-\lambda t},$$

wherein $N_o$=100 (Value of recency at time $t_o$), Nt=the recency at time t, e=a Euler number (which truncated to ten decimal places is 2.7182818284), and λ=the decay constant, which may be calculated using half-life.

The method 600 includes receiving an activity (block 601), determining a decay constant or retrieving a previously stored or default value (block 602), and calculating recency based on the decay constant (block 603).

Figure 7:
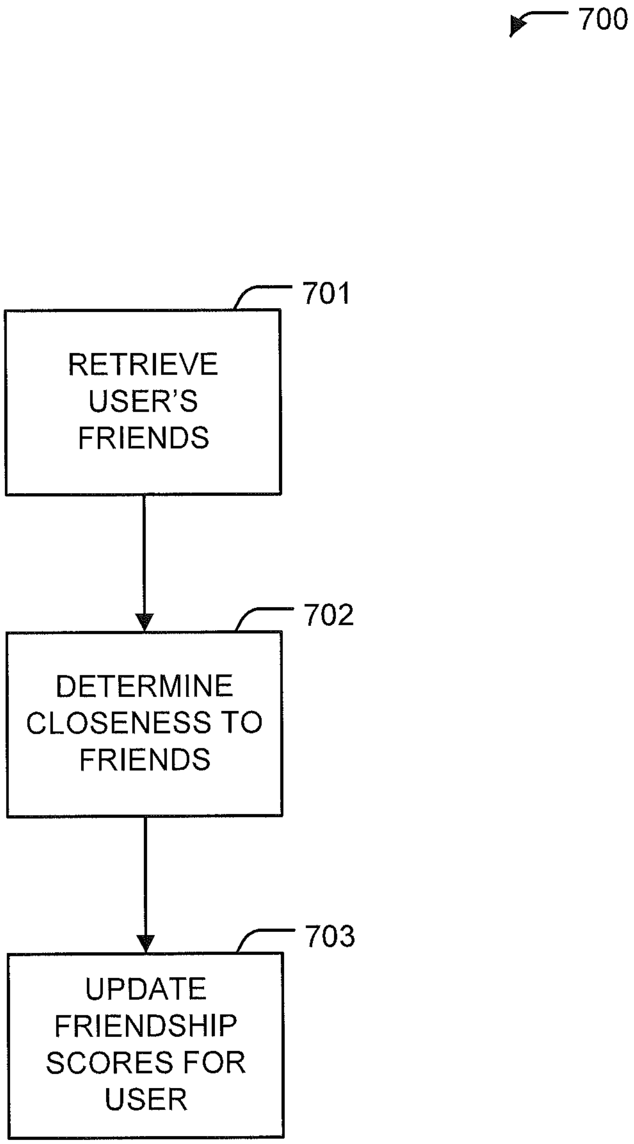
FIG. 7 illustrates a method of determining a friendship score, which may be further used to determine the relevance of an activity, according to an example embodiment.

FIG. 7 illustrates a method of determining a friendship score, which may be further used to determine the relevance of an activity, according to an example embodiment.

The method 700 includes retrieving a user's friends (block 701), determining closeness to friends (block 702), and updating a user's friendship score indicative of how close the user is to a particular friend (block 703).

Figure 8:
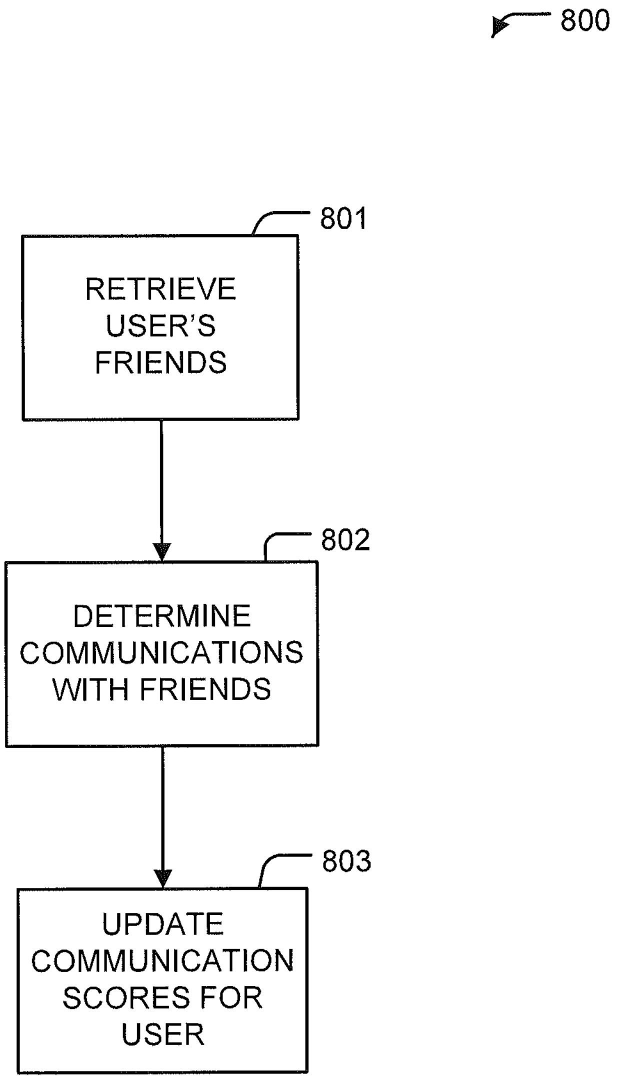
FIG. 8 illustrates a method of determining a communication score, which may be further used to determine the relevance of an activity, according to an example embodiment.

FIG. 8 illustrates a method of determining a communication score, which may be further used to determine the relevance of an activity, according to an example embodiment.

The method 800 includes retrieving a user's friends (block 801), determining types, forms, number, frequency, or other factors of communication between the user and the friends (block 802), and updating communication scores for the user (block 803).

Figure 9:
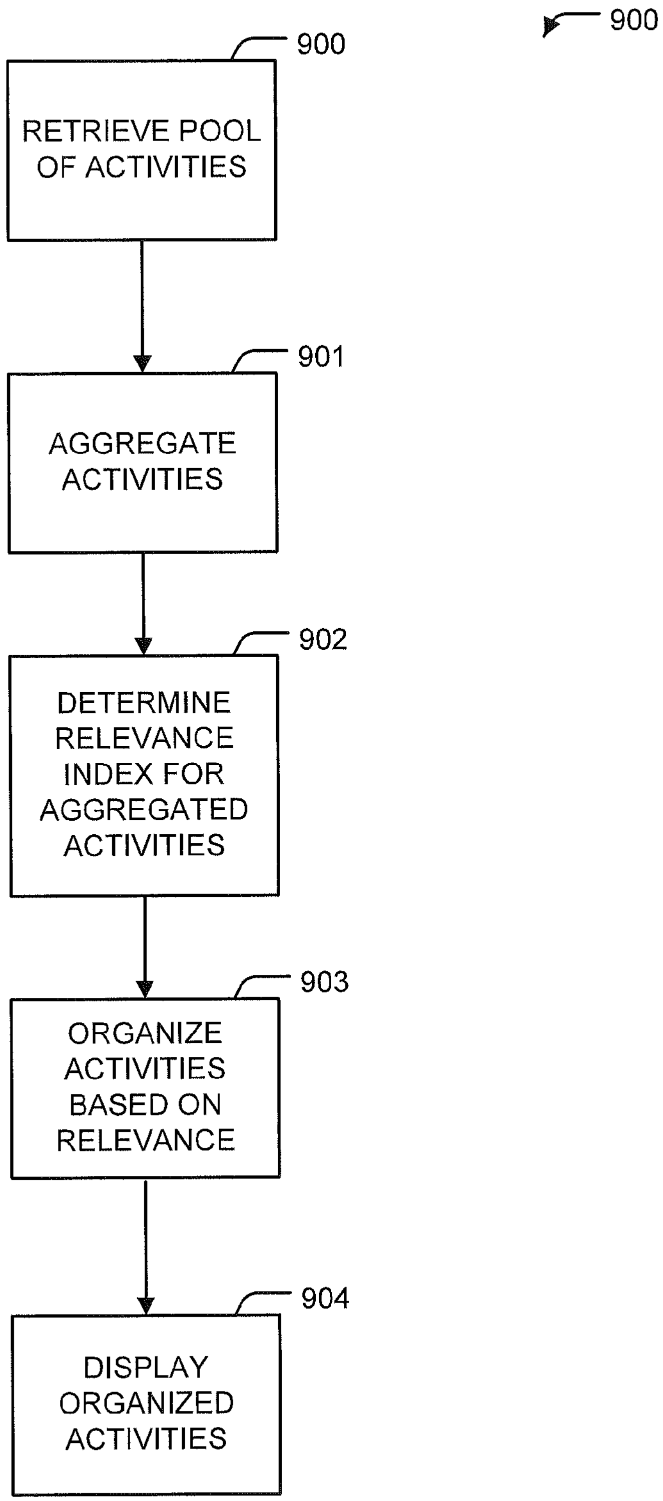
FIG. 9 illustrates a method of organizing activities on a social networking activity stream according to activity relevance, whether aggregated or individual, according to an example embodiment.

FIG. 9 illustrates a method of organizing activities on a social networking activity stream according to activity relevance, whether aggregated or individual, according to an example embodiment.

The method includes retrieving a pool of activities (block 900), aggregating activities (block 901), determining a relevance index for aggregated activities (block 902), organizing activities based on relevance (block 903) and displaying organized activities (block 904).

Figure 10A:
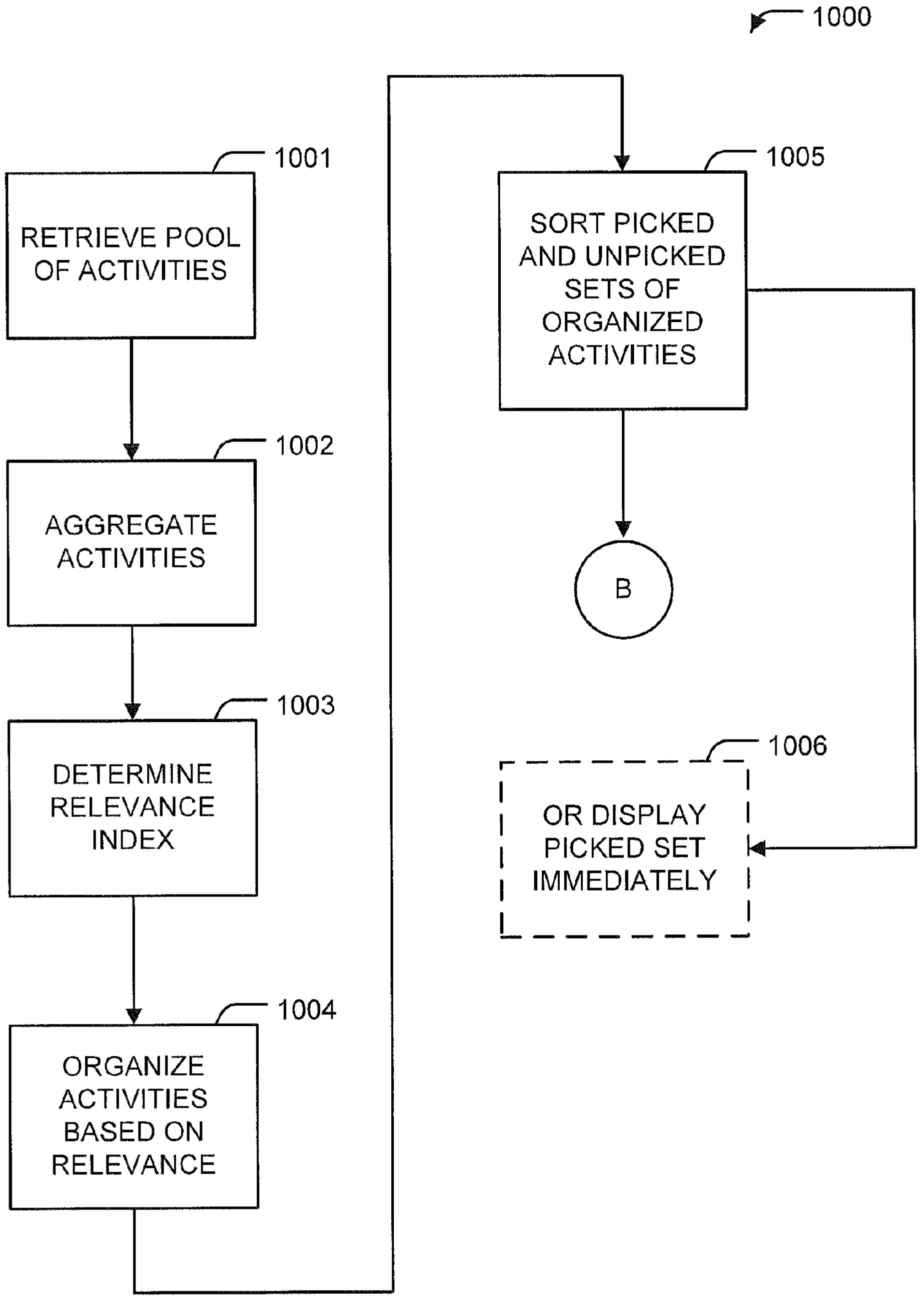
FIGS. 10A-10B illustrate a method of organizing activities on a social networking activity stream based on activity relevance, additionally taking into consideration stream diversity, according to an example embodiment.
Figure 10B:
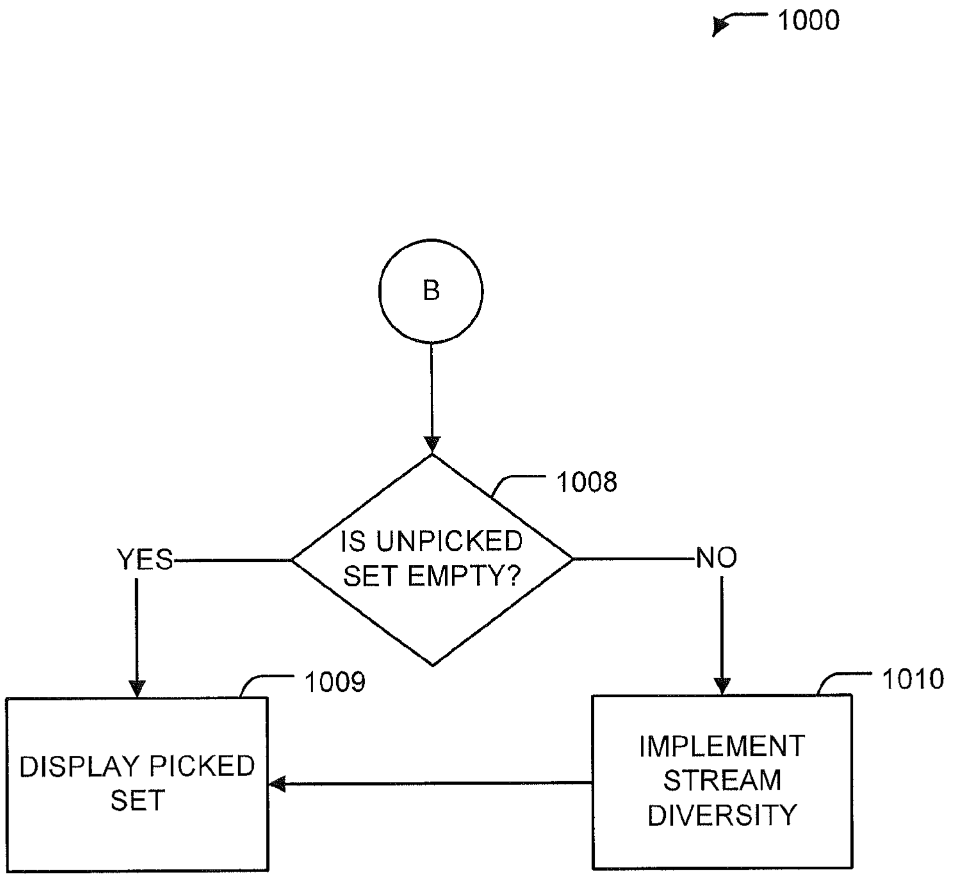

FIGS. 10A-10B illustrate a method of organizing activities on a social networking activity stream based on activity relevance, additionally taking into consideration stream diversity, according to an example embodiment.

The method 1000 includes retrieving a pool of activities (block 1001), aggregating activities (block 1002), determining a relevance index for aggregated activities (block 1003), organizing activities based on relevance (block 1004), and sorting picked and unpicked sets of organized activities (block 1005), and optionally displaying a picked set immediately (block 1006).

Such method 1000 may also further determine whether an unpicked set is empty (block 1008), and if yes, displaying a picked set (block 1009). If the unpicked set is not empty, the method may further include implementing stream diversity (block 1010) before displaying a picked set.

Figure 11:
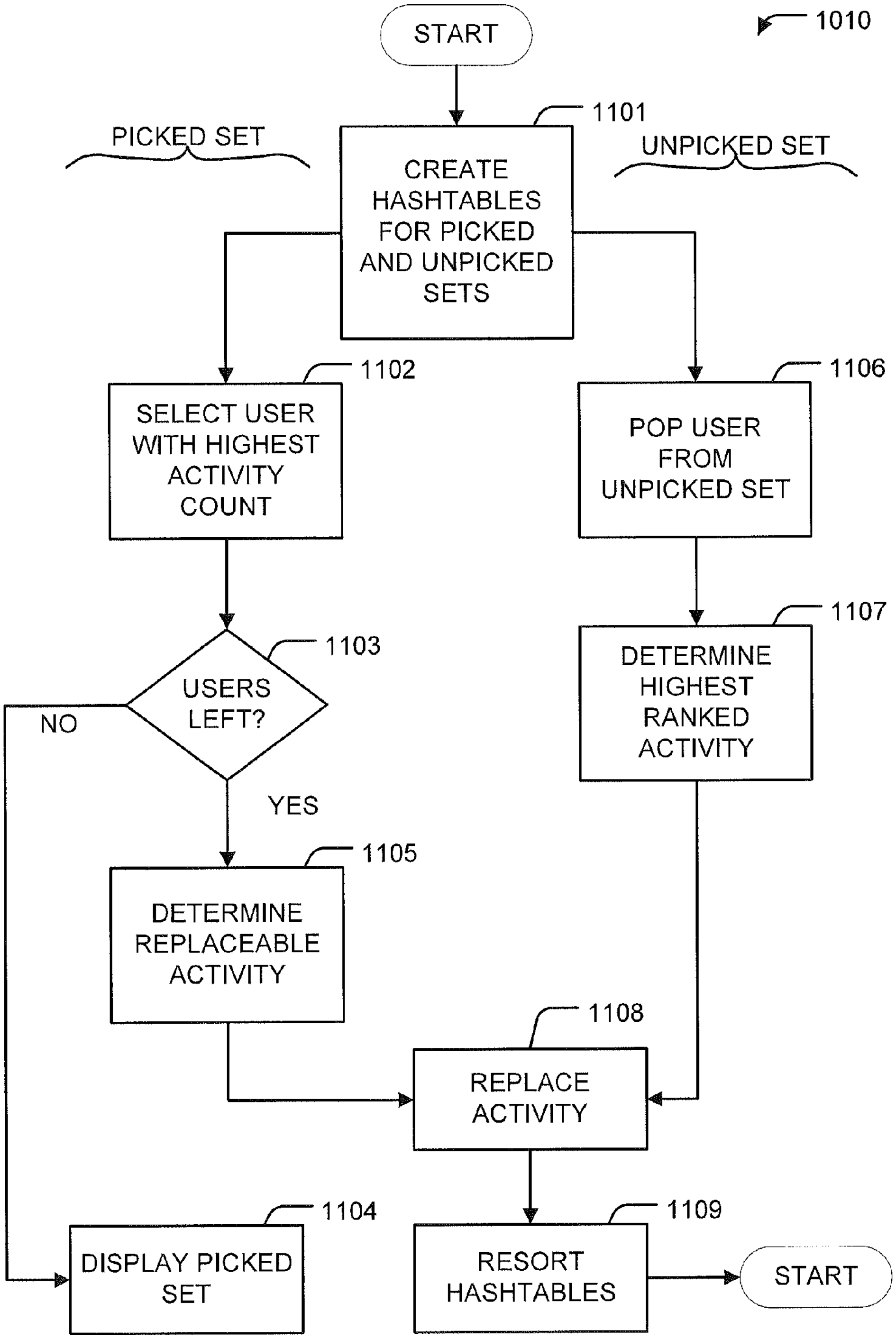
FIG. 11 illustrates a method of implementing activity stream diversity, according to an example embodiment.

FIG. 11 illustrates a method of implementing activity stream diversity, according to an example embodiment. As an example of stream diversity, if there are two friends $f_i$ and $f_j$ of user C, we can define Candidate (F,p) as the count of number of activities from friend F in a pool P. We can further define Count (F) as the number of activies from friend F displayed in C's stream. In such case, stream diversity dictates that if Candidate ($f_i$,p)>0, and Count ($f_i$)=0, then Count ($f_j$)≥k until Count ($f_i$)≥1. Thus, if there is an activity from $f_i$, then the social networking site should not show more than k activities from $f_j$ unless the site also shows at least one activity from $f_i$.

A stream diversity method 1010 may include creating hashtables for picked and unpicked sets (block 1101). For picked sets, such method may include selecting the user with highest activity count (block 1102). For example, the system can find a user where Count (u)>k and Count ($\underline{u}$)>m. When Count (u)=m, the system would pick user u+1. That is, the system will select the user with the highest activity count not lesser than k or the next highest activity count of m for user u+1). Optionally, if a user cannot be found, then the stream diversity can exit, as stream diversity needs to have at least k events from each user. If no users are left (block 1103), then the system may display the picked set (block 1104).

If users are left, the system may determine an activity to replace (e.g., the activity with the least relevance index (block 1105) and then replace the activity (block 1108). The system may then recompute user activity hashtables for users (block 1109).

After creating hashtables for picked and unpicked sets at block 1101, for unpicked sets, the system may pip a user from an unpicked set for processing (block 1106) and determine an activity to add (for example by determining the highest ranked activity according to the relevance index) (block 1107). The system may then replace the activity and resort hashtables at blocks 1108 and 1109, respectively.

Figure 12:
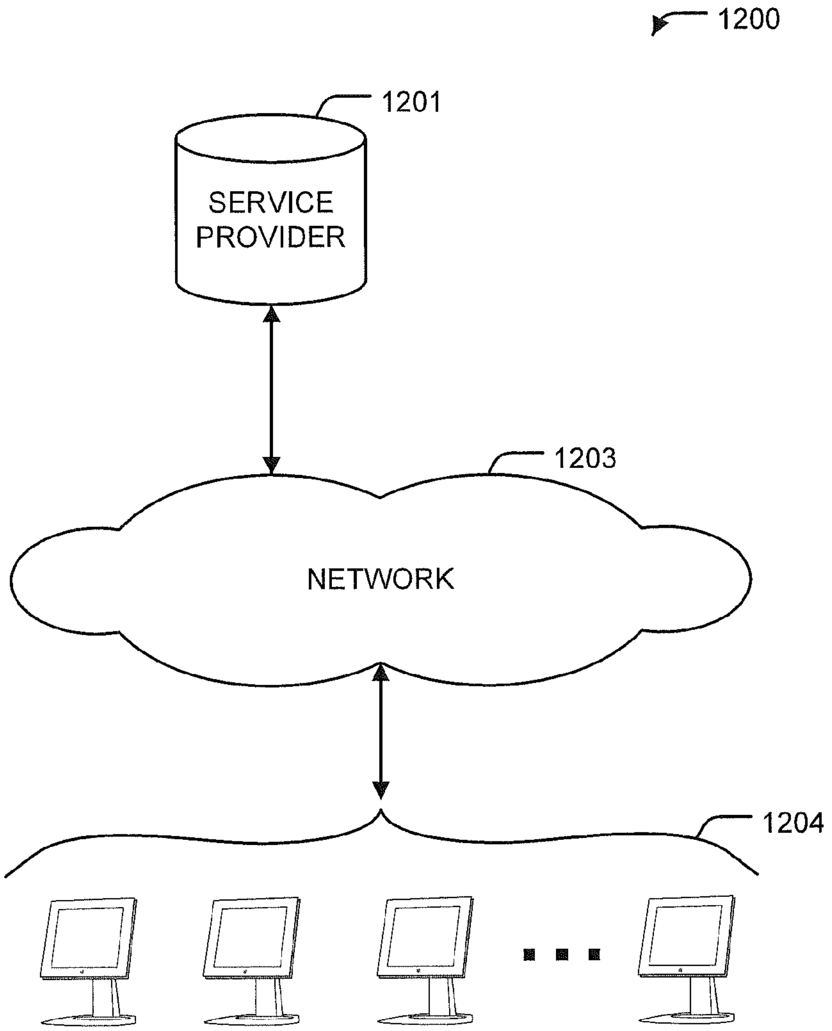
FIG. 12 illustrates a network, according to an example embodiment.

An example website and networked system is provided in FIG. 12. As illustrated, a website/service provider 1201 may provide a website hosting service over network 1203. The network, and therefore the website, may be accessed by a plurality of users/community 1204. The community may include more or less users than those depicted, and may be extensible across more networks or across the entire Internet, depending upon and desired implementation. For example, a small web community with privileged access to the provider 1201 may be assembled, for example, as a private social network. Furthermore, a public social network may be assembled. Thus, example embodiments should not be limited to only a website on the Internet, but rather any organizational model which may use a relevance index to organize and present information to users in a meaningful manner.

Figure 13:
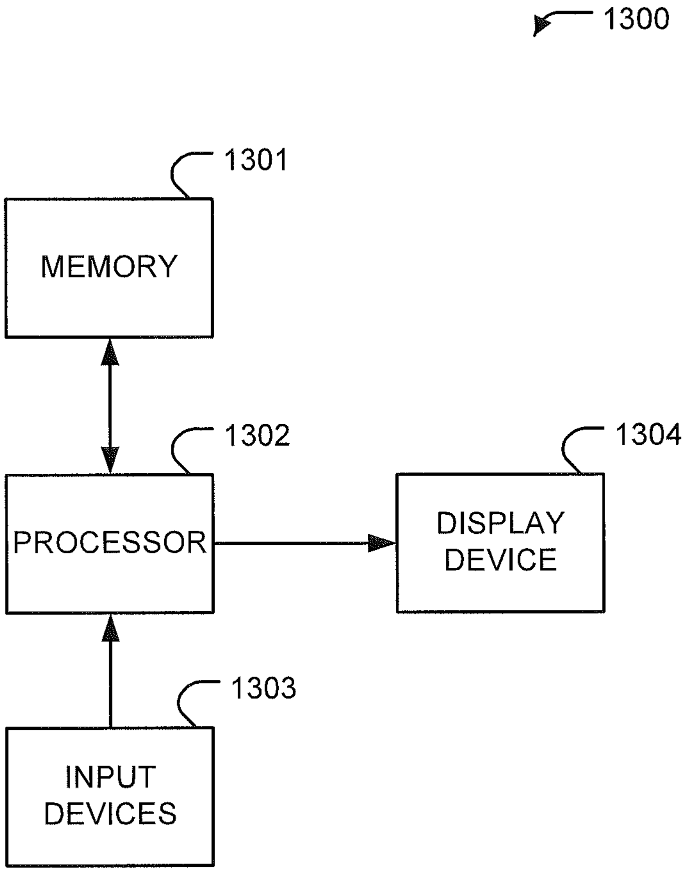
FIG. 13 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described herein-before may be implemented by a computer system or apparatus. For example, FIG. 13 illustrates a computer apparatus, according to an exemplary embodiment. Therefore, portions or the entirety of the methodologies described herein may be executed as instructions in a processor 1302 of the computer system 1300. The computer system 1300 includes memory 1301 for storage of instructions and information, input device(s) 1303 for computer communication, and display device 1304. Thus, the present invention may be implemented, in software, for example, as any suitable computer program on a computer system somewhat similar to computer system 1300. For example, a program in accordance with the present invention may be a computer program product causing a computer to execute the example methods described herein.

Figure 14:
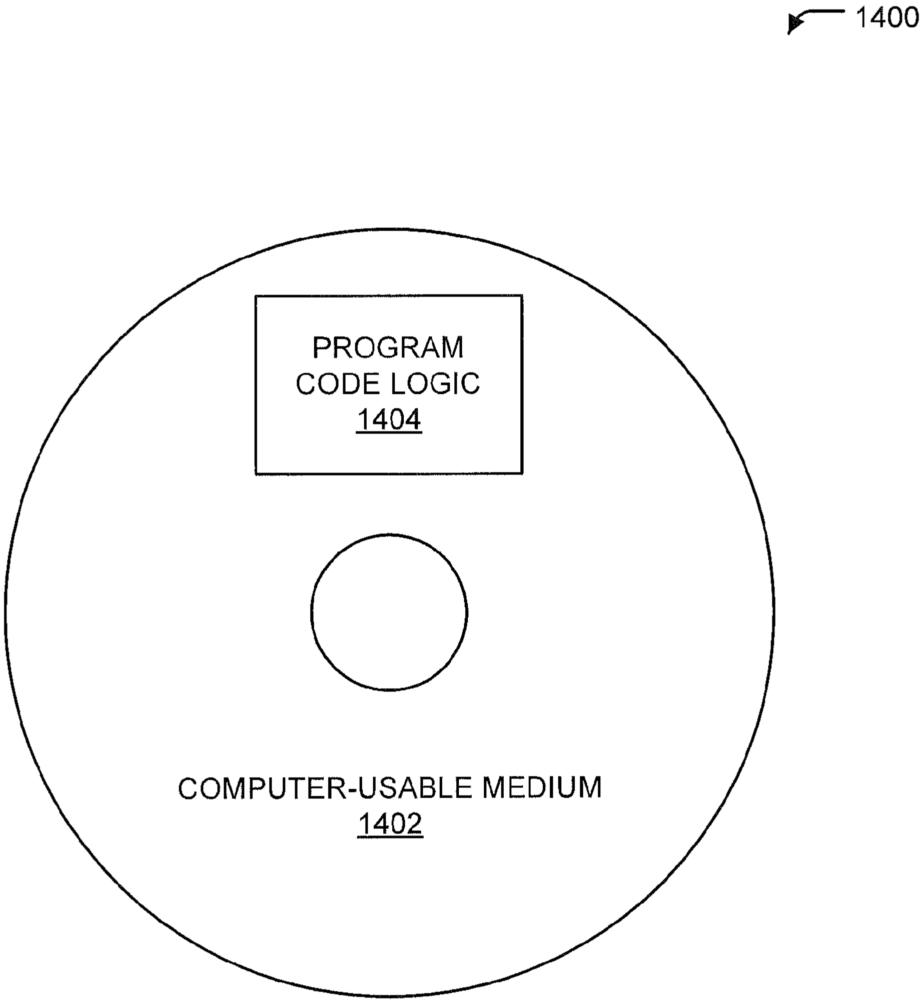
FIG. 14 illustrates a computer program product, according to an example embodiment.

Therefore, embodiments can be embodied in the form of computer-implemented processes and apparatuses for practicing those processes on a computer program product. Embodiments include the computer program product 1400 as depicted in FIG. 14 on a computer usable medium 1402 with computer program code logic 1404 containing instructions embodied in tangible media as an article of manufacture. Exemplary articles of manufacture for computer usable medium 1402 may include floppy diskettes, CD-ROMs, hard drives, universal serial bus (USB) flash drives, or any other computer-readable storage medium, wherein, when the computer program code logic 1404 is loaded into and executed by a computer, the computer becomes an apparatus for practicing the invention. Embodiments include computer program code logic 1404, for example, whether stored in a storage medium, loaded into and/or executed by a computer, or transmitted over some transmission medium, such as over electrical wiring or cabling, through fiber optics, or via electromagnetic radiation, wherein, when the computer program code logic 1404 is loaded into and executed by a computer, the computer becomes an apparatus for practicing the invention. When implemented on a general-purpose microprocessor, the computer program code logic 1404 segments configure the microprocessor to create specific logic circuits.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It should be emphasized that the above-described example embodiments of the present invention, including the best mode, and any detailed discussion of particular examples, are merely possible examples of implementations of example embodiments, and are set forth for a clear understanding of the principles of the invention. Many variations and modifications may be made to the above-described embodiment(s) of the invention without departing from the spirit and scope of the invention. All such modifications and variations are intended to be included herein within the scope of this disclosure and the present invention and protected by the following claims.

What is claimed is:

1. A computer-implemented method of organizing a stream of activities on a social networking website, comprising:

retrieving, in a computer, the stream of activities;

determining, in the computer, relevance factors for each activity in the stream of activities;

calculating, in the computer, a relevance index for each activity based on its associated relevance factors;

organizing, in the computer, the stream of activities based on each activity's relevance index, wherein the organizing considers stream diversity by not displaying, to a first user, more than a first number of activities from a first friend of the first user unless the stream also displays at least one activity from a second user; and displaying, in the computer, the organized stream of activities.

2. A method in accordance with claim 1, wherein said relevance factors are selected from one or more of an engagement portfolio value, as a weighted sum of all engagements done by a user on the social network; a user affinity, as a score of a particular user's affinities to certain activity types; a user friend affinity, as a score of a particular user's affinity to a friend's activity types; a recency, as an exponential decay function that decays activity persistence in a stream based on a predefined decay constant; a friendship, as a score based on how close knit a user is with a friend; and a communication, as a score based how often a user has interacted with a friend.

3. A method in accordance with claim 2, wherein all said relevance factors are determined.

4. A method in accordance with claim 2, wherein said relevance factors are equally weighted.

5. A method in accordance with claim 2, further comprising normalizing said one or more relevance factors and combining said normalized relevance factors to generate a relevancy index for each activity.

6. A method in accordance with claim 5, further comprising performing a relevance measurement process to convert a subjective opinion of relevance to an objective score to compare two streams for determining which stream is more relevant to a user.

7. A system, comprising:

a social networking website server; and a plurality of users in communication with the social networking website server; wherein, the social networking website server is disposed and configured to present each user of the plurality of users an organized representation of activities, the representation of activities sorted by how relevant each activity is to the particular user, and wherein the social network website server considers stream diversity when presenting the organized representation, wherein the social networking website server considers stream diversity by not displaying, to a first user, more than a first number of activities from a first friend of the first user unless the stream also displays at least one activity from a second user.

8. A system in accordance with claim 7, wherein said system is further disposed and configured to retrieve a listing of activities, determine relevance factors for each activity in the listing of activities, calculate a relevance index for each activity based on its associated relevance factors, organize the listing of activities based on each activity's relevance index, and display the organized listing of activities.

9. A system in accordance with claim 8, wherein said relevance factors are selected from one or more of an engagement portfolio value, as a weighted sum of all engagements done by a user on the social network; a user affinity, as a score of a particular user's affinities to certain activity types; a user friend affinity, as a score of a particular user's affinity to a friend's activity types; a recency, as an exponential decay function that decays activity persistence in a stream based on a predefined decay constant; a friendship, as a score based on how close knit a user is with a friend; and a communication, as a score based how often a user has interacted with a friend.

10. A system in accordance with claim 9, wherein said system is configured and disposed such that all said relevance factors are determined.

11. A system in accordance with claim 9, wherein said system is configured and disposed such that relevance factors are equally weighted.

12. A system in accordance with claim 9, wherein said system is configured and disposed such that said one or more relevance factors are normalized and combined to generate a relevancy index for each activity.

13. A system in accordance with claim 12, wherein said system is configured and disposed such that a relevance measurement process converts a subjective opinion of relevance to an objective score to compare two streams for determining which stream is more relevant to a user.

* * * * *